United States Patent [19]

Sudler

[11] 4,049,985

[45] Sept. 20, 1977

[54] DAMPING DEVICE FOR A STEPPER MOTOR

[75] Inventor: Roland Sudler, Frankfurt am Main, Germany

[73] Assignee: VDO Adolf Schindling AG, Frankfurt am Main, Germany

[21] Appl. No.: 695,460

[22] Filed: June 14, 1976

[30] Foreign Application Priority Data

June 18, 1975 Germany .............................. 2527046
Aug. 29, 1975 Germany .............................. 2538480

[51] Int. Cl.² ........................................ H02K 37/00
[52] U.S. Cl. .................................. 310/49 R; 310/74
[58] Field of Search .................. 310/49, 74, 103, 105

[56] References Cited

U.S. PATENT DOCUMENTS

| 1,895,637 | 1/1933 | Meissner ................................ 310/74 |
| 1,913,948 | 6/1933 | Perlman ................................ 310/74 |
| 1,962,659 | 6/1934 | Kautz ................................... 310/103 |
| 3,320,448 | 5/1967 | Turk ................................. 310/103 X |
| 3,627,445 | 12/1971 | Andriussi ........................ 310/103 X |
| 3,790,831 | 2/1974 | Morrealu .......................... 310/49 X |
| 3,819,966 | 6/1974 | Noguchi .............................. 310/74 |

*Primary Examiner*—Donovan F. Duggan
*Attorney, Agent, or Firm*—Otto John Munz

[57] ABSTRACT

A device for damping the natural oscillations of the rotor of a stepper motor. A permanent magnet is fixed to the rotor and magnetically coupled with an inertia mass constructed of material with distinct hysteresis. The rotor is damped by conversion of mechanical momentum to hysteresis loss.

8 Claims, 3 Drawing Figures

Fig. 1
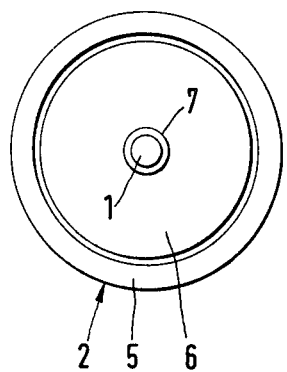
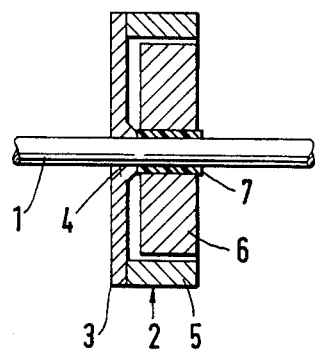
Fig. 2

DAMPING DEVICE FOR A STEPPER MOTOR

BACKGROUND OF THE INVENTION

1. Field of the Invention

This invention relates to damping devices for stepping motors.

2. Description of the Prior Art

A device is already known for damping of the natural oscillations of the rotor of a stepper motor wherein an inertia mass is fastened to the rotor shaft and a rotor which is mounted on a rotor shaft in an overhung position is connected by means of a spring with the inertia mass. In this prior structure, the rotor is cup-shaped and the inertia mass is arranged inside the rotor. Such a damping device is very useful, especially in small stepper motors with a small torque supply from the motor shaft. However, it has disadvantages with respect to its structural volume, the number of the structural parts, and the complexity of assembly. A further disadvantage consists in the wear, though relatively small, to which the known device is subjected.

SUMMARY OF THE INVENTION

The invention discloses a damping device which gets along with a small number of structural elements, can easily be assembled, can be manufactured largely by untrained personnel, and is of small structural volume. Furthermore, the disclosed device is subject to no wear or at most a negligibly small wear.

This problem is solved, according to the invention, by magnetic coupling of the rotor and the inertia mass.

Especially with a permanent-magnet rotor, which is used in nearly all stepper motors, a device according to the invention provides for a damping device, consisting of a single additional element, which is extremely simple to assemble. The inertia mass must merely be slid upon the rotor shaft. With a suitable construction of the rotor, the disclosed device has no larger structural volume than the stepper motor without the damping device. When the inertia mass is suitably mounted on the rotor shaft, moreover, no measurable wear in the device occurs.

For a stepper motor with a permanent-magnet rotor, in an embodiment preferred on account of its small structural volume, the rotor is cup-shaped and an inertia mass magnetizable at least on its outer periphery is provided inside the rotor.

In one embodiment of the invention, the magnetizable portion of the inertia mass consists of permanent magnet material magnetized in a bipolar or multipolar manner. In another embodiment, the magnetizable portion of the inertia mass is made of a material with distinct hysteresis and relatively small coercive force. This embodiment presents, in comparison with one described above, the advantage that an especially elastic coupling of inertia mass and rotor can be achieved. In the selection of the material, attention must be paid to the fact, that, at constant inertia mass, the coupling becomes less elastic at increasing coercive force, and more elastic at decreasing coercive force. The damping device of the invention can therefore be adapted, within a wide range, to the requirements of each case, which is a great advantage.

The inertia mass comprises, in one embodiment of the invention, a core of high weight, whereon a ring of magnetizable material is arranged. It is, however, more suitable to make the inertia mass completely from the magnetizable material since this results in substantial advantages with respect to manufacture.

As pointed out, it is thus possible to achieve, by magnetic coupling of the rotor and the inertia mass, an extremely efficient damping device which, particularly with a cup-shaped rotor and a magnetizable inertia mass arranged inside the rotor, is of a very small structural volume. Moreover, the arrangement of the inertia mass inside the rotor has the advantage that the permanent-magnet rotor, after its installation, can be imparted the required magnetizing force from the outside, which for many cases of application is an indispensable requirement.

However, this indispensible requirement cannot be fulfilled, when, for any reason whatever, the inertia mass cannot be arranged inside the rotor. This results essentially from the fact that the inertia mass, consisting, for example, of a disc of magnetizable material, strongly and unfavorably affects the curve of the magnetizing field.

In a further embodiment of the invention this disadvantage is overcome by providing, as the inertia mass, of disc of a paramagnetic or diamagnetic material. The front side of the disc, adjacent to the rotor front side, is provided with a thin cover of a ferromagnetic material.

By means of such a composition of the inertia mass, the ferromagnetic layer is saturated even at small magnetizing field intensities, and consequently a relevant influence upon the magnetizing field is safely avoided.

In one preferred embodiment of the invention, the inertia mass consists of a yellow-brass disc which, on one of its sides, is provided with a thin cover of iron. The thickness of the covering layer will generally amount to less than one-tenth of a millimeter and to more than one-thousandth of a millimeter.

BRIEF DESCRIPTION OF THE DRAWINGS

The invention will be explained in greater detail with the aid of the drawings, which contain in partly diagrammatical representation, two embodiments.

FIG. 1 is a plan view of the damping device according to one embodiment.

FIG. 2 is a longitudinal sectional view through the damping device of FIG. 1.

DESCRIPTION OF THE PREFERRED EMBODIMENTS

Figure 3:
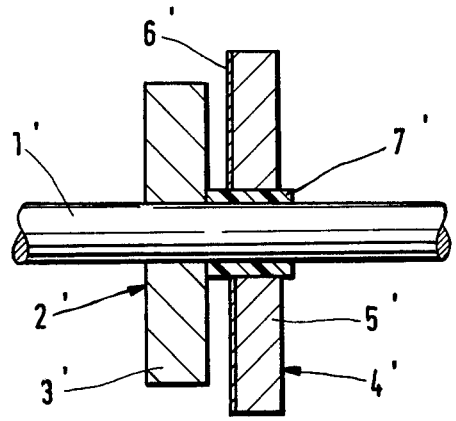
FIG. 3 is a sectional view of a second embodiment of the invention.

In FIGS. 1 and 2, the shaft 1 of the stepper motor has the rotor 2 fastened thereto. The rotor comprises an aluminum disc 3 with a central hole 4 and a permanent-magnet ring 5 magnetized radially in a multipolar manner. In the space formed by ring 5 and carrier disc 3, the inertia mass 6 is provided which is mounted on overhung position on motor shaft 1. Inertia mass 6 consists completely of a material with distinct hysteresis and relatively small coercive force. For example, inertia mass 6 may be made of tool steel. For the purpose of being supported without lubrication, inertia mass 6 is provided with a sleeve 7 of plastic material. Rotor 2 and inertia mass 6 are separated by a narrow air gap. Inertia mass 6 serves also as ground terminal for the line of flux of the rotor magnet.

In the state of rest of the damping device, magnetic poles are impressed on the hysteresis material of inertia mass 6 by the permanent-magnet rotor 2. When then rotor 2 is turned out of its position of rest, inertia mass 6 follows this movement at a small time delay. When rotor 2 has finished its step, inertia mass 6 turns on in the previous direction while rotor 2 begins to move backward. Thus, the attracting poles of rotor 2 and inertia mass 6 move away from each other, which leads to a slowing down of the rotary motions of the two parts and thus to the desired damping. The movements of the poles in the hysteresis material, occurring during the slow down, result in an elastic coupling of inertia mass and rotor, whereas the use of an inertia mass of a permanent-magnet material with impressed poles leads to a relatively rigid coupling.

In FIG. 3, the movable part of the stepper motor, shown in longitudinal section, comprises a shaft 1' on which a rotor 2' is mounted which consists of a permanent magnet 3' radially magnetized in a multipolar manner.

Furthermore, an inertia mass 4' mounted on shaft 1' in overhung position is also positioned on shaft 1'. Inertia mass 4' shaped as a disc 5' of yellow brass and is provided, on its front surface adjacent to rotor 2', with a thin cover 6' of iron. To be supported in a lubrication-free manner, disc 5' is provided with a plastic-material sleeve 7', the end part of sleeve 7' which projects toward rotor 2 also serves as spacer.

What is claimed is:

1. In a device for damping the natural oscillations of the permanently magnetized rotor of a stepper motor by means of an inertia mass arranged on the motor shaft, the improvement comprising means for magnetically coupling the rotor and the inertia mass, at least one part of the inertia mass comprising magnetizable material with distinct hysterisis and low coercive force.

2. A device according to claim 1 wherein the rotor is cup-shaped, and wherein the inertia mass is constructed of a material which is magnetizable at least on its outer periphery and is arranged inside the rotor.

3. A device according to claim 2, wherein the magnetizable portion of the inertia mass comprises a permanent-magnet material magnetized in a bipolar or multipolar manner.

4. A device according to claim 1, wherein the inertia mass consists completely of a magnetizable material.

5. A device according to claim 1, wherein the inertia mass comprises a core of high weight, and a ring of magnetizable material mounted on said core adjacent to the rotor.

6. A device according to claim 1 wherein the inertia mass comprises material which is magnetizable at least on a surface thereof which faces the rotor.

7. A device according to claim 6 wherein the inertia mass comprises:
   A. a disc of paramagnetic or diamagnetic material, and
   B. a thin layer of magnetic material affixed to a surface of the disc which faces the rotor.

8. A device for damping the natural oscillations of the permanent-magnet rotor of a stepper motor by means of an inertia mass arranged on the motor shaft and magnetically coupled with the rotor, comprising, as the inertia mass, a disc of a paramagnetic or diamagnetic material, provided, on a front surface adjacent to a rotor front surface, with a thin layer of a ferromagnetic material.

* * * * *